United States Patent [19]

Kawahara et al.

[11] Patent Number: 5,603,631

[45] Date of Patent: Feb. 18, 1997

[54] MECHANISM FOR PREVENTING DETACHMENT OF A PLUG

[75] Inventors: Akira Kawahara; Tatuhito Shinozaki, both of Tokyo; Shin'ichi Iwano, Ibaraki-ken; Kazunori Kanayama; Yasuhiro Ando, both of Tokyo; Kuniharu Katou, Ibaraki-ken; Tateomi Matumoto; Takashi Nishiyama, both of Tokyo; Toshiaki Nakano, Kanagawa-ken; Hiromasa Okamura, Tokyo, all of Japan

[73] Assignees: Hirose Electric Co., Ltd.; Honda Tsushin Kogyo Co., Ltd.; Sanwa Denki Kogyo Co., Ltd.; Nippon Telegraph Corporation, all of Tokyo, Japan

[21] Appl. No.: 423,664

[22] Filed: Apr. 17, 1995

[30] Foreign Application Priority Data

Apr. 15, 1994 [JP] Japan .................................. 6-101800

[51] Int. Cl.⁶ ........................................... G02B 6/36
[52] U.S. Cl. ................................... 439/352; 385/58
[58] Field of Search ........................... 439/350–358; 385/60, 55, 58, 62, 71, 56

[56] References Cited

U.S. PATENT DOCUMENTS

| Re. 28,328 | 2/1975 | Williams | 439/352 |
|---|---|---|---|
| 3,120,419 | 2/1964 | Dworkin | 439/359 |
| 4,522,458 | 6/1985 | Werth et al. | 439/301 |
| 5,211,572 | 5/1993 | Comstock et al. | 439/352 |
| 5,233,674 | 8/1993 | Vladic | 385/58 |

*Primary Examiner*—Neil Abrams
*Attorney, Agent, or Firm*—Lowe, Price, LeBlanc & Becker

[57] ABSTRACT

A plug (2) that includes a plug frame (7) is inserted into an opening of a housing (4) and is retained by a pair of spring-like detent pieces (6) extending into the opening. Projecting portions (6a) on the detent pieces engage recess portions (15) on right and left hand sides of the plug frame. A cylindrical lug (13) is slidably mounted on the plug frame and includes an opening portion (14) and inclined surfaces (17) to permit plug removal. The inclined surfaces (17) serve as cams to lift the projection portions (6a) out of the recess portions (15) when the lug is moved rearwardly. A stopper (3) is insertable into the plug frame to block such rearward sliding motion of the lug on the frame to prevent removal of the plug from the housing. The stopper may include a locking inward projection (3d) for engaging a hole (13b) bored in the lug to block rearward motion of the lug on the plug frame. Alternatively, the stopper may include outwardly projecting resilient stepped pieces (3i, 3j) that fit into the hole in the lug (13). Rearward sliding motion of the lug on the frame is enabled by pressing the pieces (3i, 3j) inwardly.

17 Claims, 8 Drawing Sheets

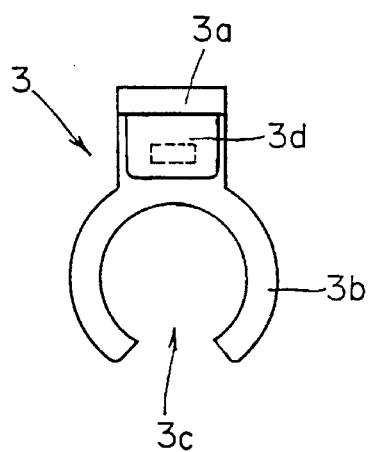
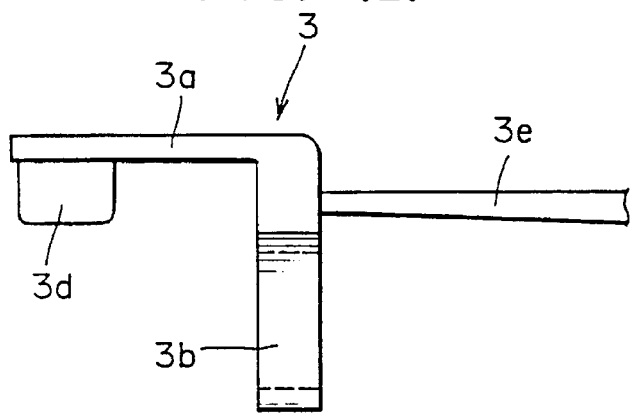
FIG.3(A)　　FIG.3(B)
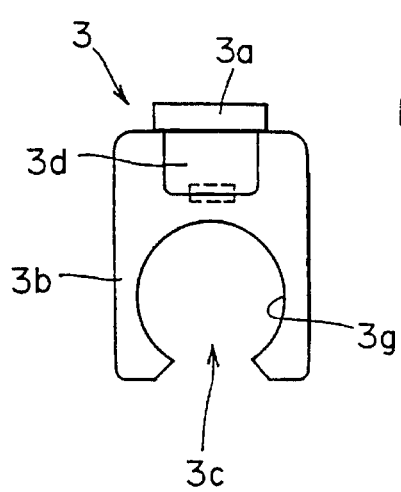
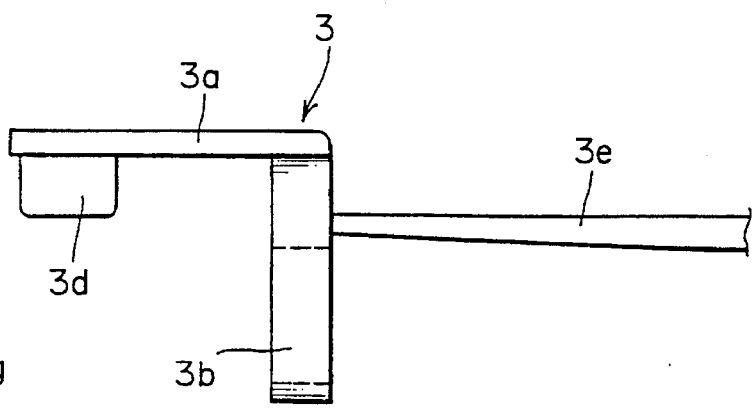
FIG.4(A)　　FIG.4(B)

PRIOR ART FIG.9
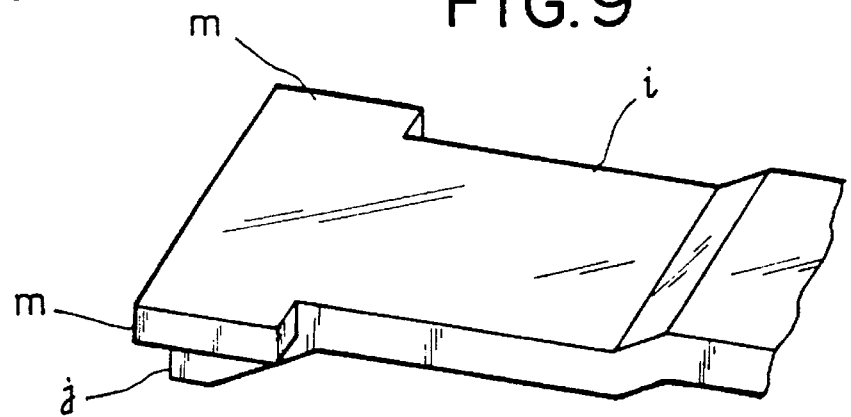
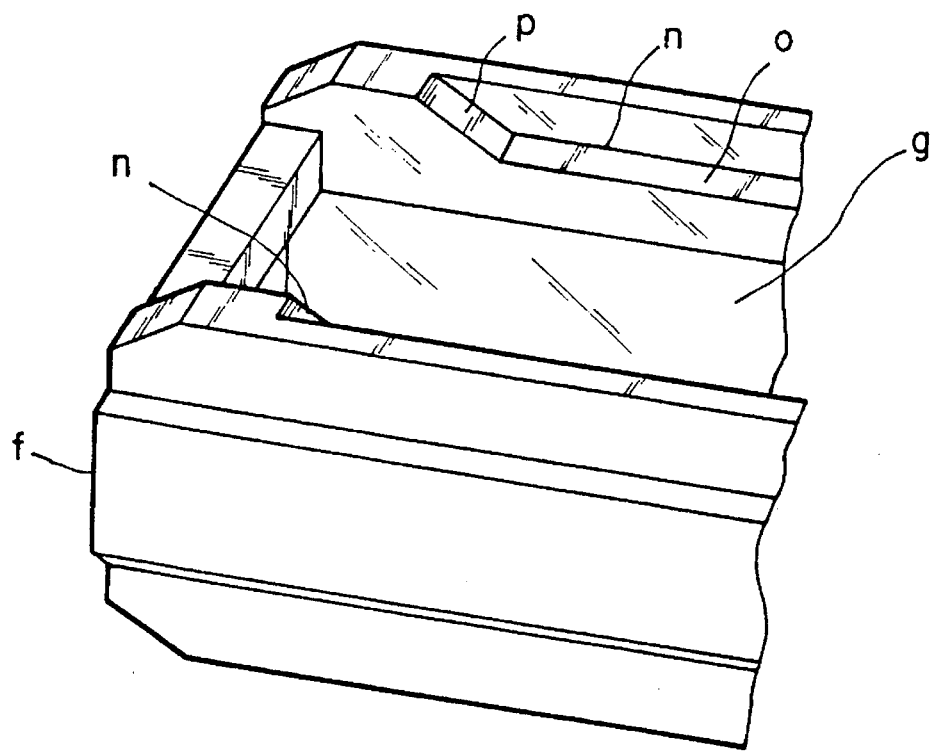

MECHANISM FOR PREVENTING DETACHMENT OF A PLUG

BACKGROUND OF THE INVENTION

1. Field of the invention

The present invention relates to a mechanism for preventing unintended detachment of a plug which ms for use in an adapter and the like for an optical connector.

2. Description of the Related Art

The conventional plug A for an optical connector is, as shown in FIGS. 7 to 9, constructed in such a way that a plug frame a, which has a transversely-long-quadrangle in cross sectional view, is engaged axially with a metallic ring b and a rubber holder (not shown) is coupled axially to a rear edge portion of the metallic ring b to be mechanically integrated therewith, and also in the center thereof, a ferrule d into the center of which a fiber c is inserted to be bonded thereto is provided through a spring e between the ferule and the metallic ring b by the insertion, and further a lug f is mounted to the outside of the plug frame a so as for the plug frame a to be able to be slid axially within the lug f by a desired stroke L.

In addition, an opening portion g having an approximately rectangular shape is provided so as to spread to the both right and left side faces of a head portion of the lug f. Detent recess portions k which are to be engaged with respective detent projection portions j of a pair of spring-like detent pieces i which are provided in right and left side faces of an adapter h are recessed in both right and left side faces of the plug frame a so as to be positioned in the respective opening portions g.

Further, in right and left inner faces of the opening portion g in the lug f, as shown in FIG. 9, portions n for guiding projections m which are provided on both right and left sides of the pair of spring-like detent pieces i are formed in front portions of horizontal bottoms o so as to have respective inclined faces p each of which is inclined so as to rise outwardly.

Then, when the plug A is inserted into the adapter h, as shown in FIG. 7, the detent projection portions j of the pair of spring-like detent pieces i are engaged with the pair of detent recess portions k of the plug A by the elastic deflection and the ferrule d of the plug A is mated with a guide tube q within the adapter h. Then, this mating state is held by the engagement between the detent projection portions j of the spring-like detent pieces i and the detent recess portions k.

In addition, when a pull-out force is applied to the lug f of the plug A, as shown in FIG. 8, the pair of spring-like detent pieces i are elastically deformed outwardly as the projections m which are provided on the both sides of the detent pieces i are guided into the respective inclined faces p in the guide portions n of the plug A while the lug f is slid to the back side (in the right direction in the figure) by a predetermined stroke L with respect to the plug frame a by that pull-out force, whereby the engagement between the detent projection portions j and the associated detent recess portions k is released.

Thus, since the above-mentioned prior art plug is easily detached by using a hand or tool, other plugs other than a predetermined plug in connection may be detached by mistake in some cases. This inadvertent, unintended, or erroneous detachment inadvertent of the plug hereinafter referred to as maldetachment of the plug, may occur particularly in the connectors used in conjunction with LAN or the like in which optical transmission lines are distributed with high density.

SUMMARY OF THE INVENTION

The present invention was made in light of the above-mentioned problem associated with the prior art, and it is therefore an object of the present invention to provide a mechanism for preventing maldetachment of a plug which is capable of preventing surely and readily the maldetachment of a plug by providing a stopper for blocking the mutual slide between a plug and a ring, and a plug frame integrated with the ring in a plug in which a sliding mechanism for pulling out a plug from an adapter or the like is provided.

In order to attain the above-mentioned object, a mechanism for preventing maldetachment of a plug according to the present invention is a plug which includes detent recess portions, in both front side faces, for being engaged with detent projection portions of a pair of spring-like detent pieces which are provided in the inside of an adapter or the like so as to be opposite to each other, an opening portion being provided in a plug frame having a ring in a rear edge thereof in such a way that the detent recess portions of the plug frame are located in the both side faces, a lug, in which inclined guide portions of the spring-like detent pieces are formed, being slidably mounted to right and left inner edges of the opening, the lug being moved back with respect to the plug frame by a predetermined stroke so that the spring-like detent pieces engaged with the detent recess portions of the plug frame are elastically deformed outwardly as guided into the inclined guide portions, thereby releasing the engagement between the spring-like detent pieces and the detent recess portions, wherein a stopper for blocking mutual slide is provided between the lug and the ring or plug frame by insertion.

The stopper is provided between the lug and the metallic ring or plug frame, whereby the mutually axial slide between the lug and the plug frame is blocked and also the lug is held in the position where the lug is slid forwardly with respect to the plug frame.

Then, when the plug is inserted into the adapter, the detent projection portions of the pair of spring-like detent pieces in the adapter are engaged with the pair of detent recess portions of the plug by the elastic deflection, and a ferrule of the plug is mated with the guide tube in the adapter. Then, this mating state is held by the engagement between the detent projection portions of the spring-like detent pieces and the associated detent recess portions.

Thus, even if a pull-out force is applied to the plug which is held in the adapter by the insertion, since the mutual slide between the lug and the plug frame is blocked by the stopper, no force for releasing the engagement between the detent projection portions and the associated detent recess portions is applied to the pair of spring-like detent pieces. Therefore, the engagement between the detent projection portions of the pair of spring-like detent pieces and the detent recess portions is maintained. This results in the plug of interest being not able to be pulled out from the adapter.

On the other hand, the stopper which is inserted between the lug and the ring or the like is detachable, whereby the lug and the plug frame can be mutually axially slid. Therefore, when after detaching the stopper of interest, the pull-out force is applied to the plug with the lug held, the lug is slid to be moved back with respect to the plug frame by a predetermined stroke by the pull-out force. As a result, as the projections which are provided on the right and left sides of the pair of spring-like detent pieces are guided into the respective inclined faces in the guide portions which are formed in the both inner edges of the opening portion of the lug, the pair of spring-like detent pieces is elastically deformed outwardly to release the engagement between the detent recess portions and the detent projection portions. Therefore, the plug of interest is detachable from the adapter.

Thus, the insertion and detachment of the plug into and from the adapter are performed on the basic connection construction. However, in a state in which the stopper is available, only the insertion of the plug into the adapter can be performed, and the detachment thereof can not be performed. Therefore, it is possible to surely prevent the maldetachment of other plugs other than a predetermined plug in connection.

BRIEF DESCRIPTION OF THE DRAWINGS

Other objects and many of the attendant advantages of this invention will be readily appreciated as the plug becomes better understood by reference to the following detailed description when considered in connection with the accompanying drawings wherein:

FIGS. 3A and 3B are respectively an elevational view of an embodiment of a stopper of the mechanism shown in FIG. 1 and a side elevational view of the embodiment of a stopper of the mechanism shown in FIG. 1 with parts partially broken away;

FIGS. 4A and 4B are respectively an elevational view of another example of a stopper of the mechanism and a side elevational view thereof with parts partially broken away;

FIG. 9 is a partially perspective view showing the relationship between spring-like detent pieces of the adapter and guide portions of a lug.

DESCRIPTION OF THE PREFERRED EMBODIMENTS

The preferred embodiments of the present invention will hereinafter be described with reference to the accompanying drawings.

Figure 1:
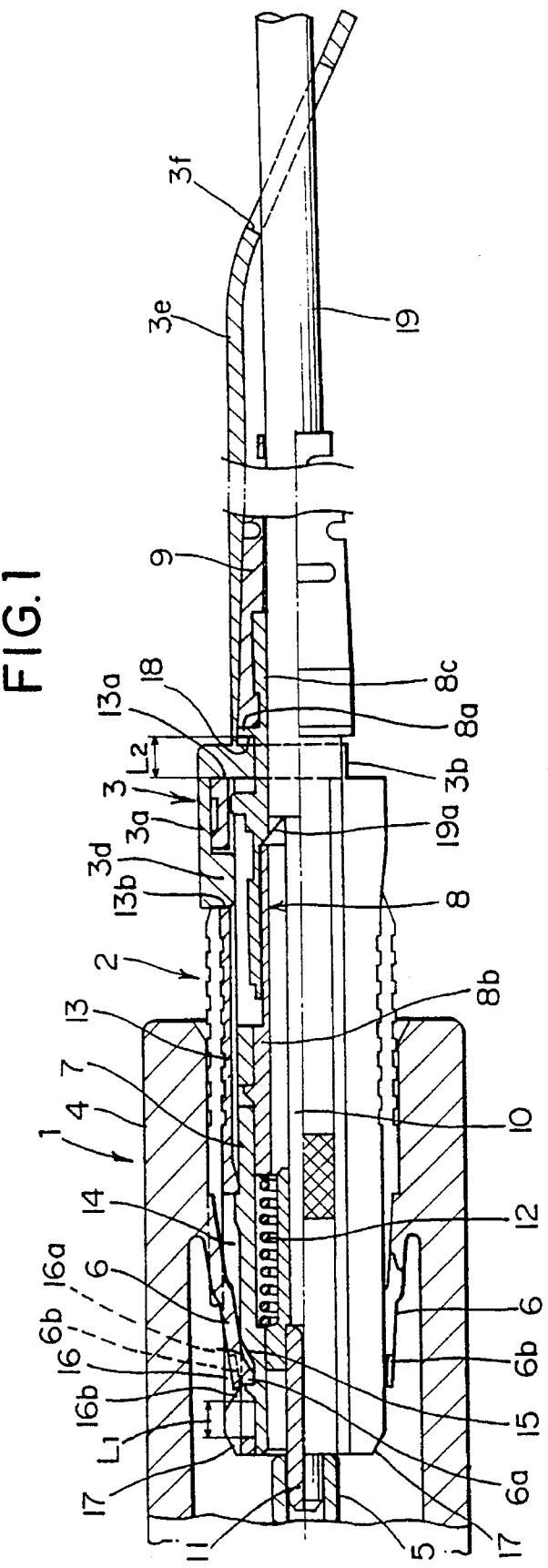
FIG. 1 is a cross sectional view showing construction of a main portion of an embodiment of a mechanism for preventing maldetachment of a plug according to the present invention in a state in which a plug is inserted into an adapter with parts partially broken away.
Figure 2:
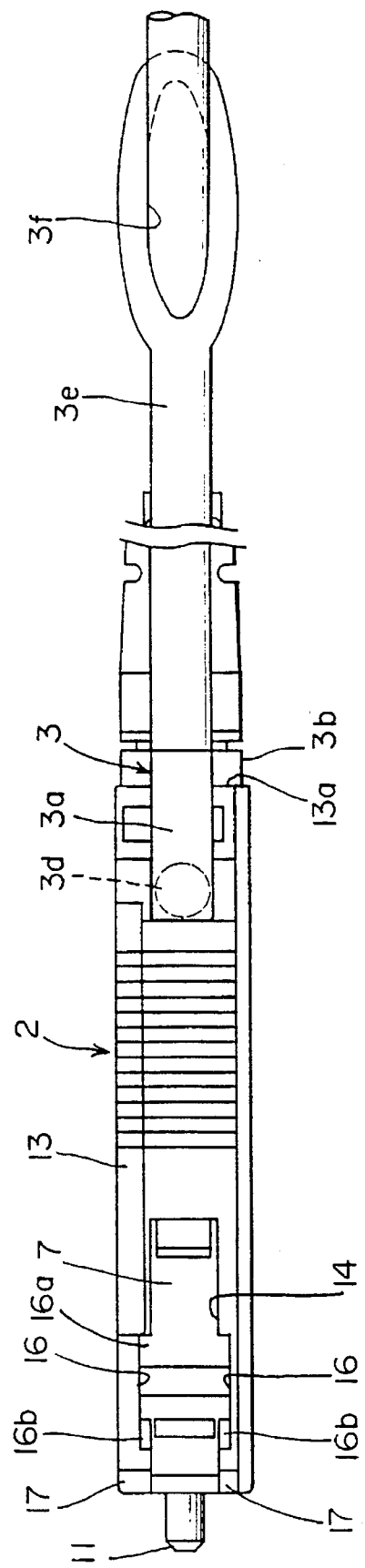
FIG. 2 is a plan view showing construction of a plug to which the mechanism for preventing maldetachment of a plug shown in FIG. 1 is mounted.

FIG. 1 is a cross sectional view showing a state in which a plug 2 is inserted into an adapter 1 with parts partially broken away, FIG. 2 is a plan view showing the plug 2, FIGS. 3A and 3B are respectively an elevational view of a stopper 3 and a side elevational view thereof with parts partially broken away, and FIGS. 4A and 4B are respectively an elevational view of another embodiment of the stopper 3 and a side elevational view thereof with parts partially broken away.

As shown in FIG. 1, a tubular housing 4 of the adapter 1 has a cross-sectional shape of a transversly-elongated-quadrangle, and is mounted to a measurement apparatus (not shown), or to any other apparatus, by a bracket (not shown) which is mounted to a rear and thereof (the left side in FIG. 1).

A guide tube 5 with which a ferrule of the plug 2 as will be described later is to be mated is provided at the center of the inside of the housing 4. In right and left side faces of the guide tube 5, a pair of cantilever-shaped spring-like detent pieces 6, which are made of synthetic resin are provided so as to be projected from an inner wall face of the housing 4. In addition, at the inner central portion of a head portion of each spring-like detent piece, a detent projection portion 6a is provided so as to be projected therefrom.

Next, as shown in FIG. 1, both a plug frame 7 having a transversely-enlongated-quadrangle plan view and a metallic ring 8 are axially mounted in the plug 2. A rubber holder 9 is axially coupled to a rear end portion of the ring 8 to be mechanically integrated therewith. A ferrule 11 is provided at a forward end of the ring, and a spring 12 is provided between the ferrule 11 and the ring 8. A fiber 10 is inserted through the center of the ferrule 11 and is boned to the ferrule.

In addition, as shown in FIGS. 1 and 2, a lug 13 is provided in the outside of the plug frame 7 so that the plug frame 7 can be slid axially within the lug 13 (in the right and left directions in FIGS. 1 and 2) by a desired stroke L1.

An opening portion 14 having an approximately rectangular shape in plan view is provided so as to spread to both the right and left side faces of the end portion of the lug 13. In addition, detent recess portions 15 which are to be engaged with respective detent projection portions 6a of a pair of right and left spring-like detent pieces 6 in the adapter 1 are provided in the right and left side faces of the plug frame 7 so as to be located in the opening portion 14.

Further, in the right and left inner edges of the opening portion 14 in the lug 13, guide portions 16 for guiding projections 6a which are provided on the right and left sides of the pair of spring-like detent pieces 6 are formed so as to have respective inclined faces 16b, which are inclined outwardly, in the front portions of horizontal bottoms 16a.

Furthermore, on the both sides of the end portion of the lug 13, inclined faces 17 are formed which serve to press outwardly and guide the projections 6b, provided in the right and left side faces of the head portions of the pair of spring-like detent pieces 6, when inserting the plug 2 into the adapter 1.

Then, a slide gap 18, which has the same width L2 as the stroke L1, is axially formed between a rear end face 13a of the lug 13 and a flange 8a which is provided in the peripheral face of the ring 8. Also, in the gap 18, a stopper 3 is detachably inserted which serves to block the mutual slide between the lug 13, and the frame 7 and the ring 8 which is mechanically integrated with the frame 7. Incidentally, in the present embodiment, the ring 8 means a ring wherein a stop ring 8b and a caulking ring 8c for fixing a coupler 19a of an optical fiber code 19 are coupled to each other to be mechanically integrated with each other.

Next, the description will hereinbelow be given with respect to the construction of the stopper 3.

The stopper 3 shown in FIG. 1 to FIGS. 3A and 3B includes a plane portion 3a, a mating portion 3b which has an approximately semicircle appearance in elevational view, is provided upstandingly from a base portion of the plane portion 3a and has an opening portion 3c in a lower end thereof, a locking projection 3d which is provided so as to be projected from a lower surface of the head of the plane portion 3a, and a tape 3e for preventing drop from the plug which extends from the base portion of the plane portion 3a to a rear side. In this connection, those portions are integrated with one another to form the stopper 3 by utilizing plastic, hard rubber or the like having elasticity as a raw material.

The opening portion 3c is formed such that the mating portion 3b is detachably held in the gap 18 by its elastic deformation, and also the locking projection 3d is formed so as to function to perform both the locking and fixing of the stopper 3 such that the locking projection 3d is detachably held to be mated with a hole 13b which is bored through the lug 13. As a result, when the stopper 3 is turned around the side face of the plug 2 so that in particular, the plug 2 is mounted adjacent thereto, it is effectively blocked that the plug 2 becomes not able to be inserted into the adapter 1.

In addition, a lengthwise hole 3f is formed axially lengthwisely in the rear end portion of the drop preventing tape 3e so that an optical fiber code 19 is inserted through the lengthwise hole 3f, thereby blocking the stopper 3 from being dropped (falling) from the plug 2. However, alternatively, the tape 3e may also be directly coupled to the optical fiber code 19.

Further, with respect to the stopper 3, it may also be adapted so that as shown in FIGS. 4A and 4B, the mating portion 3b thereof is formed into a plate-like shape of a rectangle in elevational view, and at the center of the mating portion 3b, a mating recess portion 3g is recessed which has an approximately semicircle appearance in elevational view and has the opening portion 3c in a lower end thereof.

Figure 5:
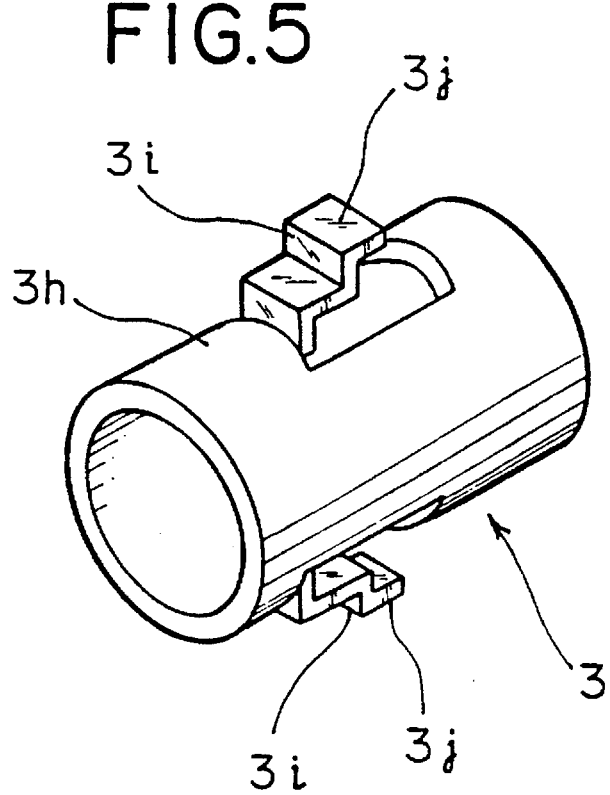
FIG. 5 is a perspective view showing construction of another embodiment of a stopper of the mechanism.

FIG. 5 is a perspective view of another embodiment of the stopper 3.

The stopper 3 of the present embodiment includes a ring portion 3h which is to be fitted to a periphery of the ring 8 of the plug 2, a detent plate portion 3i which is step-cut (two steps in the present embodiment) from a rear end of a side face of the ring 3h to the outside, and an operation piece portion 3j which extends horizontally from the head of the detent plate portion 3i. In this connection, those portions are integrated with one another to form the stopper 3 by utilizing a metallic plate, plastic or the like having elasticity as a raw material. Incidentally, a set of the detent portion 3i, the operation piece portion 3j and the like are provided in each of the opposite positions of the ring portion 3h.

Figure 6:
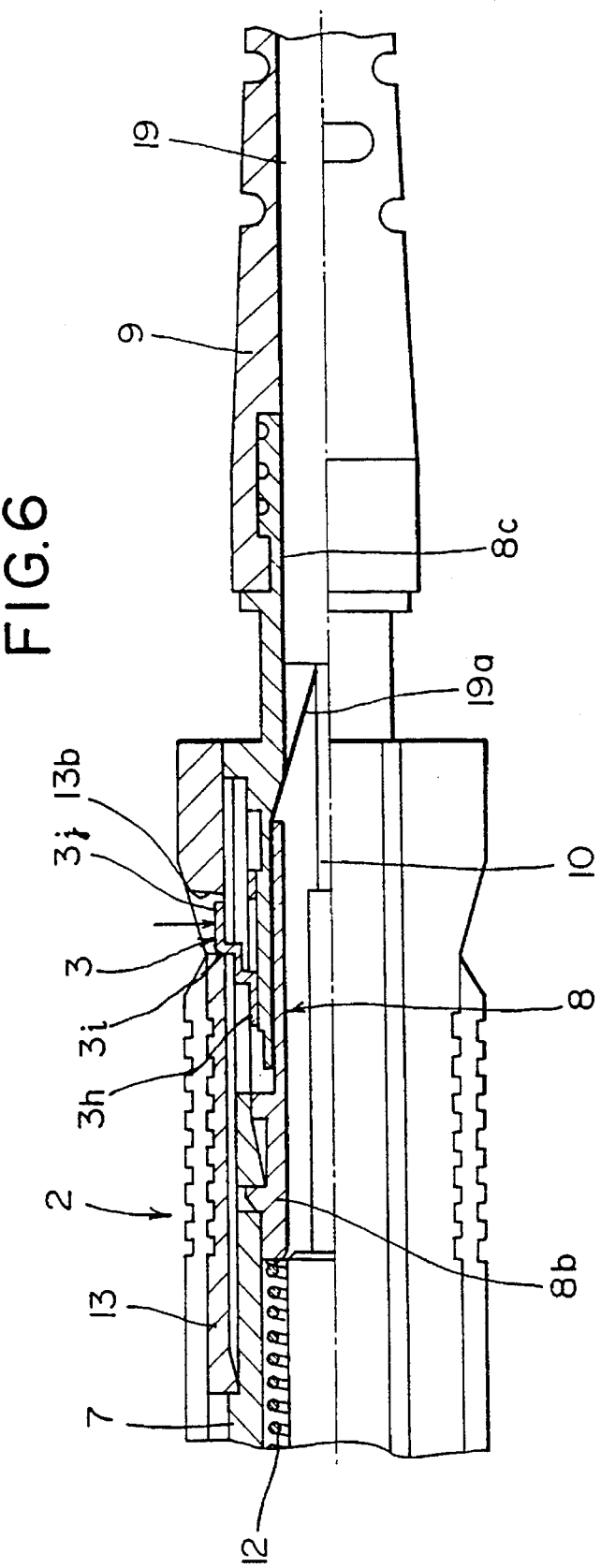
FIG. 6 is a cross sectional view showing construction of a main portion of another embodiment of the mechanism in a state in which a plug is inserted into an adapter with parts of a plug partially broken away.
Figure 7:
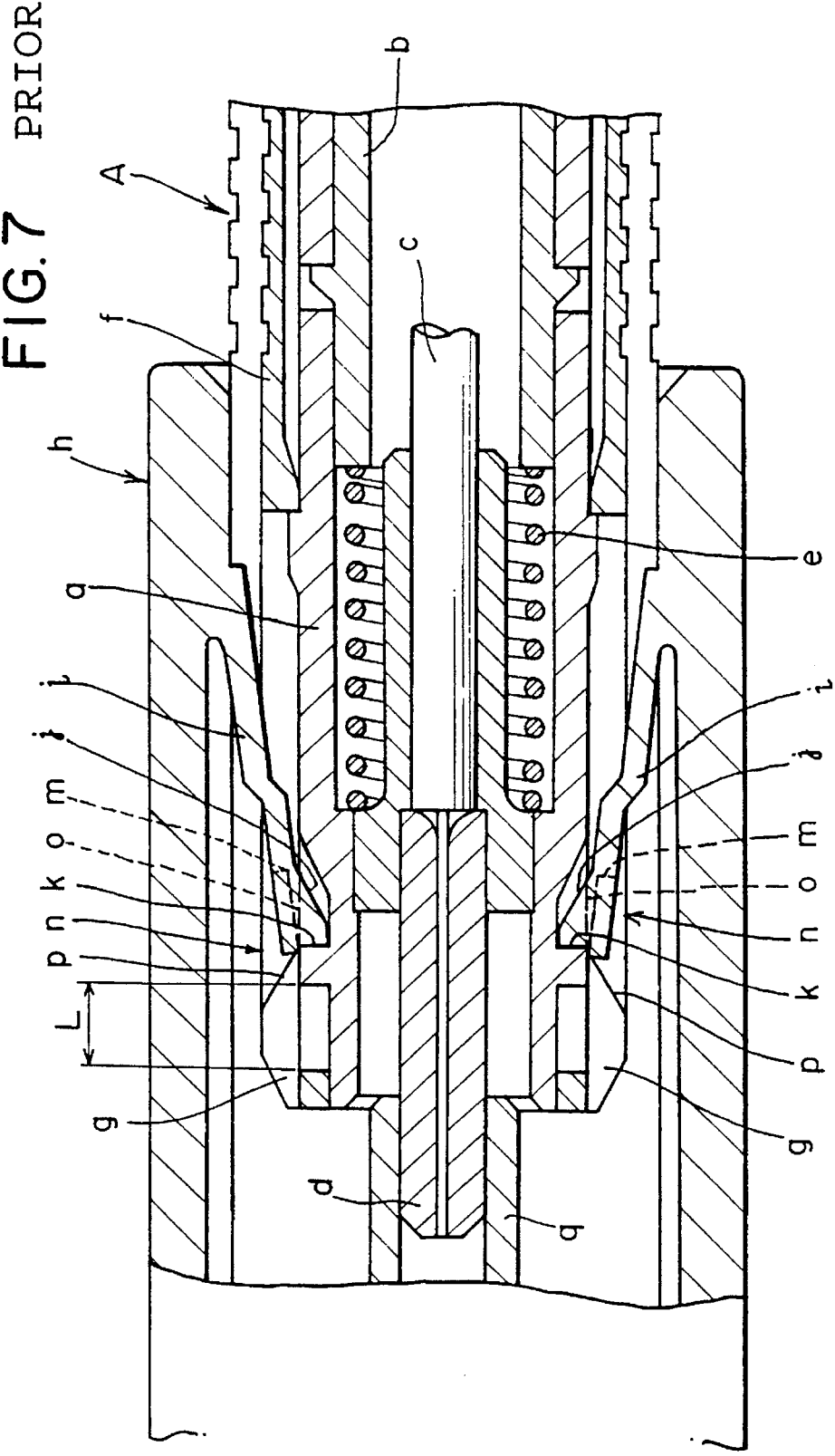
FIG. 7 is a vertical cross sectional view showing a state in which the conventional plug for an optical connector is inserted into an adapter with parts partially broken away.
Figure 8:
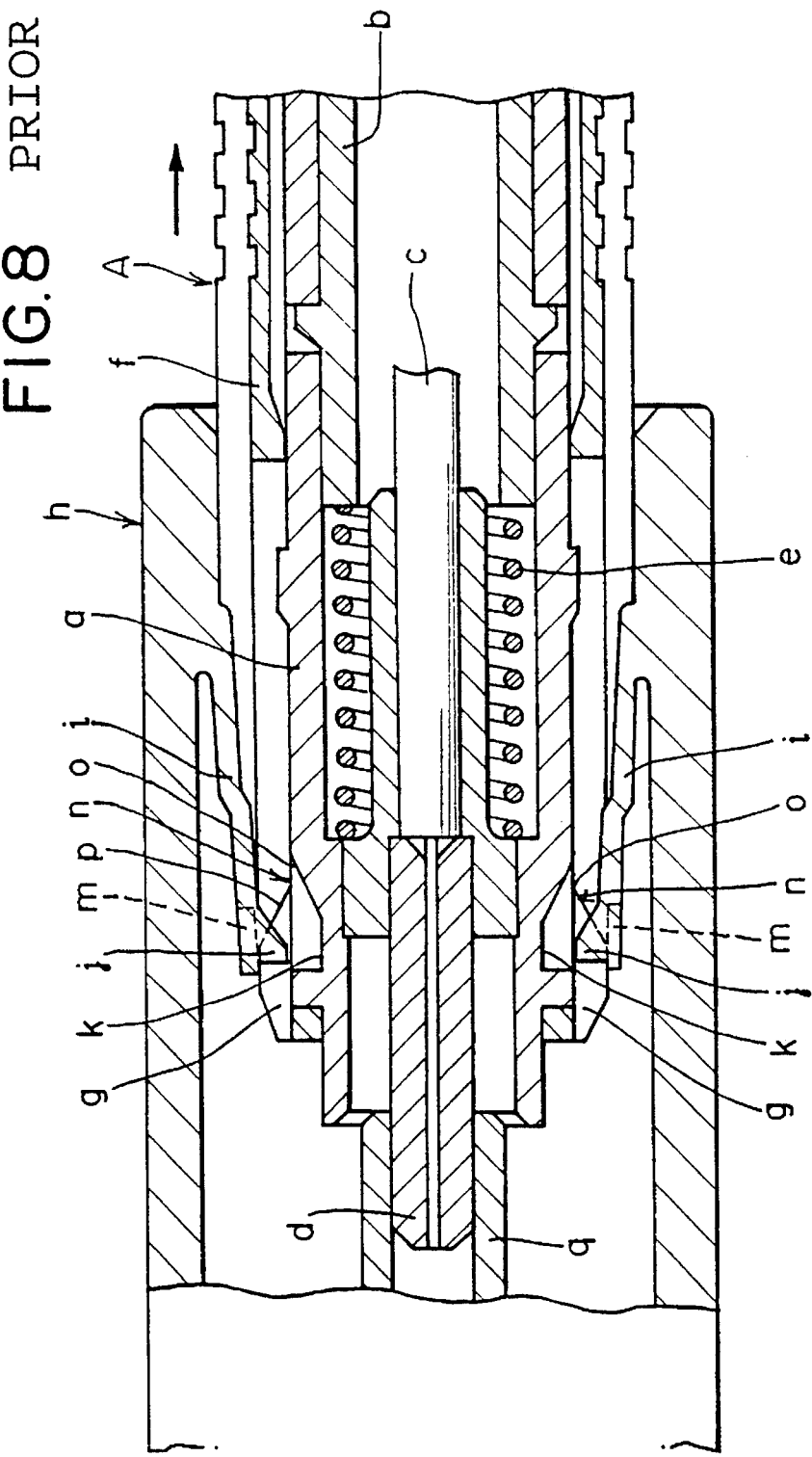
FIG. 8 is a vertical cross sectional view showing a state in which the plug shown in FIG. 7 is detached from the adapter with parts partially broken away.

Then, the stopper 3 is, as shown in FIG. 6, mechanically integrated with the plug 2 by mounting the ring portion 3h to the ring 8 which is located on the side of the plug 2. In addition, its operation pieces 3j are respectively inserted into the holes 13b which are bored through the both faces of the lug 13, whereby the inner edge portions of the holes 13b are engaged with the respective detent plate portion 3i to block the mutual slide between the plug frame 7 and the ring 8 integrated therewith.

In the above-mentioned stopper 3, the known tool for pulling out/inserting the plug (not shown) or driver (not shown) is inserted into the holes 13b to press the operation piece portions 3j inwardly, whereby the detent plate portions 3i are elastically deformed in the rear direction (in the right direction in FIG. 6) against its elasticity to release the engagement between the detent plate portions 3i and the inner edge portions of the holes 13b, and as a result, the plug 2 is pulled out from the adapter 1.

Incidentally, the stopper 3 is not limited in construction to the above-mentioned embodiments as long as it can block the mutual slide between the lug 13 and the plug frame 7. Further, in addition to the position between the lug 13 and the ring 8, the stopper 3 may also be provided in the position between the lug 13 and the plug frame 7.

In addition, the present invention is not limited to the single core of the embodiments described above, and a multiple cores the number of cores of which is equal to or more than that of two cores may also be available.

The mechanism for preventing maldetachment of a plug according to the present invention has the construction as described above. Therefore, even if the pull-out force is applied to the plug of interest, since the mutual slide between the lug and the plug frame is blocked, the pair of spring-like detent pieces are not elastically deformed at all by that pull-out force, and the engagement between the spring-like detent pieces and the detent recess portions of the plug frame is maintained, whereby it is possible to surely prevent the maldetachment of the plug. Therefore, it is prevented that other plugs in connection other than the predetermined plug are pulled out by mistake. Accordingly, the mechanism for preventing maldetachment of a plug according to the present invention is particularly suitable for plugs for connectors which are used in conjunction with LAN or the like in which the optical transmission lines are distributed with high density.

In addition, the operation for inserting the plug into the adapter or the like in a state in which the stopper is available and the operation for pulling out the plug in a state in which the stopper is detached can be readily performed on the basis of the basic connection construction without any hindrance. Further, since in addition to the simple construction, the conventional plug can be directly applied without any improvement, the mechanism for preventing maldetachment of a plug is inexpensive.

It will be appreciated that the above-mentioned embodiments have been described by way of example only and that many variations are possible without departing from the scope of the invention.

What is claimed is:

1. A plug including a plug frame having two front faces, detent recess portions in both front faces for engaging detent projection portions of a pair of spring-like detent pieces which are opposingly provided on inner surfaces of an adapter, an opening portion arranged in said plug frame so that said detent recess portions of said plug frame are located in both side faces, said plug frame having a ring in a rear edge thereof, a lug including inclined guide portions for said spring-like detent pieces, said lug being slidably mounted to right and left inner edges of said opening, said spring-like detent pieces engaged with said detent recess portions of said plug frame being positioned to be elastically deformed outwardly while being guided into said inclined guide portions when said lug is moved rearwardly with respect to said plug frame by a predetermined stroke, thereby releasing the engagement between said spring-like detent pieces and said detent recess portions, and a stopper for blocking slide of said lug being positioned between said lug and one of said ring or plug frame, by insertion in said lug.

2. A plug according to claim 1, wherein said stopper includes a plane portion, a mating portion projecting downwardly from a base portion of said plane portion and having an opening portion in a lower end thereof, a locking projection projecting from a lower surface of a head end of said plane portion, and a tape for preventing drop from said plug, said tape extending rearwardly from the base portion of said plane portion.

3. A plug according to claim 1, wherein said stopper includes a ring portion configured for fitting a periphery of said ring of said plug, an outwardly projecting detent plate portion which is step-cut from a rear end of a surface of said ring portion, and an operation piece portion which extends horizontally from a head of said detent plate portion.

4. A plug according to claim 2, wherein said mating portion has a substantially semicircular elevational view.

5. A plug according to claim 2, wherein said mating portion is formed into a plate-like shape having a substantially rectangular elevational view, and a mating recess portion being recessed at a center of the plate-like shape, said mating recess portion having an approximately semicircular elevational view and having said opening portion in a lower end thereof.

6. A plug according to claim 4, wherein said stopper is made of plastic or hard rubber having elasticity and has an integrated one-piece construction.

7. A plug according to claim 4, wherein said stopper is made of material selected from a group consisting of a metallic plate and a plastic having elasticity, and has an integrated one-piece construction.

8. A plug according to claim 5, wherein said stopper is made of plastic or hard rubber having elasticity and has an integrated one-piece construction.

9. A plug according to claim 5, wherein said stopper is made of material selected from a group consisting of a metallic plate and a plastic having elasticity, and has an integrated one-piece construction.

10. A mechanism for controlling detachment of a plug detachably into an opening portion of a housing, comprising:

a stopper for preventing detachment of the plug, said housing having at least one spring-like detent piece extending in said opening portion, said plug including a plug frame and a cylindrical lug fitted slidably to said plug frame, said plug frame having, at least at one side face thereof, a recess portion for engaging a projection portion of said spring-like detent piece extending in said opening portion when said plug is inserted into said housing, said lug having an opening portion corresponding to said recess portion of said plug frame, said lug further having, at a side of said opening portion, an inclined surface for cammingly lifting said projection portion of said detent piece from said recess portion of said plug frame when said lug is moved in a rearward direction, * said stopper including an elastic member having a cylindrical inner face fitted to an inside portion of said plug frame, said elastic member having a structure fitting detachably on to said plug frame to prevent said lug from sliding rearward when said plug has to be prevented from coming out of said housing.

11. A mechanism according to claim 10, wherein said plug and housing comprise a fiber optic connector, said plug frame including a guide tube therein including an optical fiber therein, said optical fiber bonded to a ferrule, said ferrule at least partly surrounded by said guide tube.

12. A mechanism according to claim 10, wherein said plug frame has two recess portions, at right and left side faces thereof, and said housing has a pair of said spring-like detent pieces extending in said opening portion, each said spring-like detent piece having two projection portions, said two recess portions each respectively engaging two projection portions of said pair of spring-like detent pieces, said cylindrical lug has a pair of opening portions corresponding to said recess portions of said plug frame, said cylindrical lug having, at right and left sides of each of said pair of opening portions, inclined surfaces for cammingly lifting said two projection portions of said pair of spring-like detent pieces from said two recess portions of said plug frame when said lug is moved in a rearward direction.

13. A mechanism according to claim 12, wherein said plug and housing comprise a fiber optic connector, said plug frame including a guide tube therein including an optical fiber therein, said optical fiber bonded to a ferrule, said ferrule at least partly surrounded by said guide tube.

14. A mechanism for controlling detachment of a plug detachably into an opening portion of a housing, comprising:

a stopper for preventing detachment of the plug, said housing having at least one spring-like detent piece extending in said opening portion, said plug including a plug frame and a cylindrical lug fitted slidably to said plug frame, said plug frame having, at least at one side face thereof, a recess portion for engaging a projection portion of said spring-like detent piece extending in said opening portion when said plug is inserted into said housing, said lug having an opening portion corresponding to said recess portion of said plug frame, said lug further having at a rear portion thereof a hole into which said stopper is fitted, and having, at a side of said opening portion, an inclined surface for cammingly lifting said projection portion of said detent piece from said recess portion of said plug frame when said lug is moved in a rearward direction, said stopper including an elastic member having a cylindrical inner face fitted to an inside portion of said plug frame and elastic pieces outside said cylindrical inner face, said elastic member having a structure fitting detachably on to said plug frame for positioning said elastic pieces to prevent said lug from sliding rearward when said plug has to be prevented from coming out of said housing, said elastic pieces being inwardly displaceable in response to pressure to allow said lug to slide rearward.

15. A mechanism according to claim 14, wherein said plug and housing comprise a fiber optic connector, said plug frame including a guide tube therein including an optical fiber therein, said optical fiber bonded to a ferrule, said ferrule at least partly surrounded by said guide tube.

16. A mechanism according to claim 14, wherein said plug frame has two recess portions, at right and left side faces thereof, and said housing has a pair of said spring-like detent pieces extending in said opening portion, each said spring-like detent piece having two projection portions, said two recess portions each respectively engaging two projection portions of said pair of spring-like detent pieces, said cylindrical lug has a pair of opening portions corresponding to said recess portions of said plug frame, said cylindrical lug having, at right and left sides of each of said pair of opening portions, inclined surfaces for cammingly lifting said two projection portions of said pair of spring-like detent pieces from said two recess portions of said plug frame when said lug is moved in a rearward direction.

17. A mechanism according to claim 16, wherein said plug and housing comprise a fiber optic connector, said plug frame including a guide tube therein including an optical fiber therein, said optical fiber bonded to a ferrule, said ferrule at least partly surrounded by said guide tube.

* * * * *